T. SHUMAN.
STOVE-PIPE THIMBLES.

No. 193,560. Patented July 24, 1877.

WITNESSES:
D. P. Cowl
Jno. P. Jacobs.

Thomas Shuman
INVENTOR.

J. McC. Perkin
ATTORNEY.

N. PETERS, PHOTO-LITHOGRAPHER, WASHINGTON, D. C.

UNITED STATES PATENT OFFICE.

THOMAS SHUMAN, OF CORNING, IOWA.

IMPROVEMENT IN STOVE-PIPE THIMBLES.

Specification forming part of Letters Patent No. 193,560, dated July 24, 1877; application filed January 15, 1877.

*To all whom it may concern:*

Be it known that I, THOMAS SHUMAN, of Corning, in the county of Adams and State of Iowa, have invented certain new and useful Improvements in Stove-Pipe Thimbles; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claim.

Figure 1:
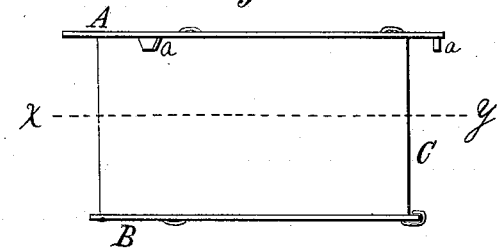
Figure 3:
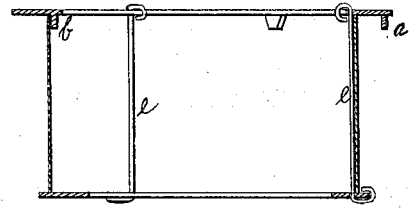
Figure 2:
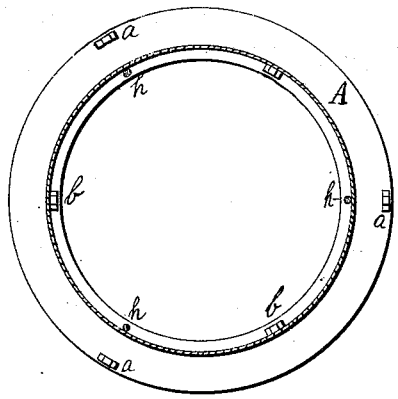
Figure 4:
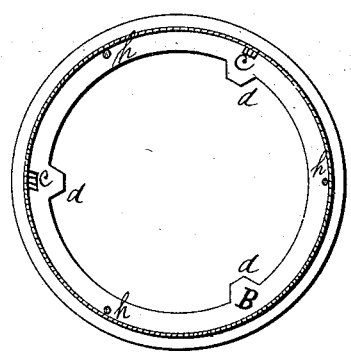

Figure 1 is a side view of my invention. Fig. 2 is a horizontal sectional view taken through the dotted line $x\,y$, and looking upward from the bottom. Fig. 3 is a side interior view when my thimble is vertically bisected. Fig. 4 is a horizontal sectional view taken through the dotted line $x\,y$, and looking downward from the top.

A is an annular disk, forming the front or outside of my thimble. $a\,a$ are lugs near the outer circumference of the disk; and $b\,b$ are lugs near the inner circumference of the disk. B is the inner disk of my thimble, provided with the projections $d\,d$ on its inner periphery and the lugs $c\,c$. C is a short cylinder, made of tin or other suitable material, to either end of which the disks A and B are attached. $h\,h$ are small holes in the disks A and B, into which holes the wires $e\,e$ are fastened, and thus forming my thimble complete. The lugs $b\,b$ and $c\,c$ form projections into the interior of the cylinder C, and thus keep it firmly in place. The lugs $a\,a$ are embedded in the plastering, keeping the thimble rigidly in place.

The projections $d\,d$ embrace the stove-pipe as it enters the thimble, leaving the intervening space for the exit of the air heated by the pipe.

Having now fully described my invention, what I claim, and desire to secure by Letters Patent, is—

In a stove pipe thimble the disks A and B, in combination with the cylinder C, the disk A being provided with the lugs $a\,a$ and $b\,b$ and holes $h\,h$, and the disk B being provided with the projections $d\,d$ and the lugs $c\,c$ and the holes $h\,h$ and the wires $e\,e$, substantially as described, and for the purposes set forth.

In testimony that I claim the foregoing I have hereunto set my hand this 31st day of March, 1876.

THOMAS SHUMAN.

Witnesses:
F. M. BUCKLES,
W. B. ROBERTS.